United States Patent [19]

Stevens et al.

[11] 4,003,961
[45] Jan. 18, 1977

[54] LINEAR COPOLYMERS OF GLYCIDOL

[75] Inventors: Violete L. Stevens; Arthur R. Sexton; Frederick P. Corson, all of Midland, Mich.

[73] Assignee: The Dow Chemical Company, Midland, Mich.

[22] Filed: Dec. 22, 1975

[21] Appl. No.: 643,451

Related U.S. Application Data

[62] Division of Ser. No. 444,078, Feb. 20, 1974.

[52] U.S. Cl. .................. 260/874; 204/159.11; 204/159.16; 260/2 BP; 260/2 XA; 260/18 EP; 260/76; 260/77.5 AM; 260/78.41; 260/486 R; 260/486 B; 427/391; 428/339; 526/222; 526/225; 526/272; 526/273; 526/292; 526/296; 526/317; 526/321; 526/332; 526/318

[51] Int. Cl.$^2$ .................................... C08G 23/22
[58] Field of Search .............. 260/2 A, 2 BP, 874, 260/47 EP, 47 EQ, 18 EP, 20 X, 76, 77.5, 78.4 EP, 80 M, 80 P, 89.5 A, 615 B, 346.7, 830, 486 R, 486 B

[56] References Cited

UNITED STATES PATENTS

| | | | |
|---|---|---|---|
| 2,680,109 | 6/1954 | Stevens et al. | 260/88.3 A X |
| 3,446,756 | 5/1969 | Ramos | 260/2 EP |
| 3,509,074 | 4/1970 | Kamio et al. | 260/2 A |
| 3,519,559 | 7/1970 | Quinlan | 260/2 A |
| 3,578,719 | 5/1971 | Kalopissis et al. | 260/611 B |

FOREIGN PATENTS OR APPLICATIONS

| | | | |
|---|---|---|---|
| 1,267,259 | 3/1972 | United Kingdom | 260/2 |

OTHER PUBLICATIONS

Chem. Abs. 66:29874m; 66, p. 2877.

*Primary Examiner*—Murray Tillman
*Assistant Examiner*—T. DeBenedictis, Sr.
*Attorney, Agent, or Firm*—C. E. Rehberg; D. H. Fifield

[57] ABSTRACT

Linear copolymers of glycidol, glycidyl esters of unsaturated fatty acids and, optionally, alkylene oxides, are made by the reaction of an unsaturated fatty acid with a polymer or copolymer of tert.-butyl glycidyl ether in the presence of an acid catalyst. The products are polymerizable and copolymerizable with vinyl monomers and are useful as curable resins.

4 Claims, No Drawings

LINEAR COPOLYMERS OF GLYCIDOL

This is a division of application Ser. No. 444,078, filed Feb. 20, 1974.

BACKGROUND OF THE INVENTION

U.S. Pat. No. 3,519,559 discloses polymers of tert.-butyl glycidyl ether (hereinafter TBGE) and copolymers with alkylene oxides and teaches that the terminal hydroxyl groups thereof can be esterified with polycarboxylic acids to produce polymeric esters useful in breaking water-in-oil emulsions.

British Patent 1,267,259 discloses the condensation of TBGE with a variety of compounds having at least one active hydrogen atom and, in a second step, the removal of the tert.-butyl groups, thus producing linear polyglycidols.

U.S. Pat. No. 2,680,109 discloses the polymerization of glycidyl methacrylate through the epoxy group to produce a linear polymer that can then be further polymerized and crosslinked through the methacrylate groups.

U.S. Pat. No. 3,509,074 discloses the copolymerization of isobutylene oxide and glycidyl methacrylate (95:5 by weight).

French Patent 1,438,201 (C.A., 66, 2877, No. 29874 m) shows copolymerization of a mixture of ethylene oxide, propylene oxide and glycidyl methacrylate.

SUMMARY OF THE INVENTION

The invention comprises new, substantially linear, compounds of the formula

$$R[(R'O)_m X]_n$$

wherein R is the residue left by the removal of n active hydrogen atoms from an initiator compound, $RH_n$; each R' independently is an alkylene radical selected from the group consisting of ethylene, trimethylene, tetramethylene, 1,2-butylene, 2,2-bis(halomethyl)-1,3-propylene, and groups of the formula

$$-CH_2CHCH_2A$$
$$\phantom{-CH_2CH}|$$

each A independently is H, Cl, Br, or OX; each X independently is H or the acyl radical of a carboxylic acid with the proviso that at least one R' is 3-hydroxy-1,2-propylene and at least one is a group of the formula

$$-CH_2CHCH_2OX$$
$$\phantom{-CH_2CH}|$$

wherein X is the acyl radical of an $\alpha,\beta$-unsaturated carboxylic acid; and m and n are integers such that the total number of R'O groups is at least 2.

The term "linear," as used herein, refers to each of the polyoxyalkylene backbone chains attached to the initiator residue, R. Obviously, if n in the above formula exceeds 2 the molecule as a whole could be considered to be branched.

The invention also comprises a convenient method for making the compounds of the above formula. One method is by acylating the desired proportion of the hydroxyl groups in substantially linear polyglycidol or a copolymer of one or more alkylene oxides with glycidol, said copolymer being initiated by the initiator, $RH_n$. Methods for the preparation of such intermediates are described in the references cited above and in U.S. Pat. Nos. 3,578,719, 3,595,924 and 3,446,756.

In a preferred method the tert.-butyl groups of a polymer or copolymer of tert.-butyl glycidyl ether (TBGE) are removed and the desired proportion thereof directly replaced with ester groups by heating the polymer or copolymer with a strong acid catalyst, preferably a sulfonic acid, in the presence of the acid corresponding to the desired ester.

Many of the unique properties and uses of the above compounds arise from the presence of both hydroxymethyl and polymerizable acyloxymethyl groups as substituents on the backbone chains of the compounds. These substituents are more or less randomly arranged and may be present in a very wide range of proportions, as indicated by the above formula.

A very small proportion, of polymerizable acyloxymethyl groups, or even a single such group, is sufficient to render the compounds copolymerizable with other vinyl-type monomers that polymerize by a free radical mechanism and to render coatings comprising the compounds curable by exposure to free radicals, as by exposure to heat and/or radiation or contact with organic peroxides or other free radical generators.

The presence of one or more hydroxymethyl groups likewise opens many possibilities for modification of the compounds. Any or all of them can be esterified with one or more acids, isocyanates, or the like. By use of hydrophobic acids, such as long-chain fatty acids, the hydrophobic-hydrophylic balance of the compounds can be controlled over a wide range. Thus, for instance, hydrophobic coating materials can be made by esterifying a portion of the hydroxymethyl groups with stearic acid. Such materials can then be crosslinked and rendered solvent resistant by polymerization through the unsaturated acid moieties as described above. Similarly, dialdehydes, particularly glyoxal, can be used to link two of the hydroxyl groups through hemiacetal linkages. Such linking is reversible by treatment with aqueous base. Under more severe conditions, irreversible acetal crosslinks can be formed.

DETAILED DESCRIPTION OF THE INVENTION

The preferred compounds of the invention are those wherein R is the residue of an initiator compound, $RH_n$, which is a hydroxy compound free of other substituents reactive with an alkylene oxide. Suitable such compounds include the alkanols, such as methanol, butanol, octanol, dodecanol and octadecanol; the alkenols, such as allyl alcohol, 10-undecen-1-ol, oleyl alcohol, and the like; alkylene glycols, such as ethylene, propylene, butylene, 1,4-tetramethylene and 1,3-hexylene glycols; the higher aliphatic polyols such as glycerol, pentaerythritol, sorbitol, sucrose, hexanetriol and the like; phenols, such as phenol, cresols, xylenols, hydroquinone, resorcinol, naphthols, and the like and aralkanols, such as benzyl alcohol and phenethyl alcohol, and the like. It is preferred that the initiator have not more than 8 active hydrogen atoms, and preferably not more than 3. Especially preferred initiators are water and the glycols. Water reacts with alkylene oxides or tert.-butyl glycidyl ether (TBGE) to open the oxirane ring, thus producing a glycol which may then be regarded as a glycol initiator prepared in situ. Analogous reactions take place with oxetanes and tetrahydrofurans.

The substantially linear polymer or copolymer of glycidol that can be used to make the compounds of the invention may be made in any convenient manner. For instance, a polymer of TBGE or a copolymer thereof with one or more alkylene oxides may be made by the polymerization of the monomers, as described in U.S. Pat. No. 3,519,559. The tert.-butyl groups may then be removed by warming the material in the presence of an arylsulfonic acid, as is shown in British Patent 1,267,259, thus replacing the tert.-butoxy groups with hydroxy groups. Any desired proportion of the latter can then be esterified with an α,β-unsaturated carboxylic acid. The terminal hydroxyls may be likewise esterified.

In a preferred method, TBGE, in conjunction with one or more alkylene oxides if desired, is condensed with an initiator compound (which may be the moisture incidentally present in the reactants and/or apparatus), and then the tert.-butoxy groups are removed and the desired proportion of ester groups are simultaneously attached by warming the polymer with an arylsulfonic acid or similar catalyst in the presence of sufficient α,β-unsaturated carboxylic acid to produce the desired proportion of ester groups.

If any substantial part of the acid to be used in the esterification step is a polycarboxylic acid, it is preferably used in the form of its anhydride and in the proportion of one mole of anhydride per equivalent of hydroxyl to be esterified, thus producing a partial ester of the acid. If one attempts to totally esterify such an acid, its polyfunctionality causes branching and, ultimately, crosslinking of the substrate. Moreover, because of the likelihood of transesterification and resultant crosslinkage, the polycarboxylic acid anhydride should be reacted separately and only after the reaction of any monocarboxylic acid.

Suitable monocarboxylic acids for use in practicing the invention include acrylic, methacrylic, α-chloroacrylic, crotonic and cinnamic acids. Suitable α,β-unsaturated polycarboxylic acid anhydrides include maleic, itaconic, citraconic, glutaconic and chloro- and bromomaleic anhydrides. Other suitable anhydrides include those of succinic, adipic, phthalic, trimellitic and hemimellitic acids and the corresponding alkyl- and halo-substituted compounds.

Since all practical methods for making the compounds of the invention involve a condensation polymerization of the initiator compound with a glycidyl compound (substituted alkylene oxide), one or more other cyclic ethers can be copolymerized with the glycidyl compound in this step. Suitable such ethers include ethylene, propylene, butylene and styrene oxides, epichlorohydrin tetrahydrofuran, oxetane, 2,2-bis(-halomethyl)oxetane and the like. Such copolymers may be heteric (random), wherein the monomers were reacted simultaneously, or they may be block copolymers, wherein the monomers were reacted sequentially in any desired sequence and proportions. The number of oxyalkylene units in the polymer chains ($m$ in the above formula) may vary from two to many thousands, depending on the monomers and catalyst used in its preparation.

The compounds of the invention are polymers which range from oily liquids to solids depending on molecular weight, the nature of the initiator moiety and the identity, proportions and arrangement of the various other moieties present. Those compounds that are initially liquid can be converted to solid form by polymerization or copolymerization through the polymerizable double bond of the α,β-unsaturated acid. These materials are useful as curable resins that can be formed into coatings or shaped articles which can then be cured by exposure to heat, radiation or source of free radicals, thus being rendered harder and more resistant to heat and solvents.

SPECIFIC EMBODIMENTS OF THE INVENTION

The following examples illustrate the practice of the invention.

A. Preparation of TBGE Polymers and Copolymers

Monomeric tert.-butyl glycidyl ether (TBGE) was homopolymerized or copolymerized in various proportions with other cyclic ethers in known manner, the products and their preparation being summarized in Table I. The indicated initiators were the active hydrogen compounds used to initiate the polymer chains. In all runs, the reaction was continued until all TBGE and other alkylene oxides fed to the reactor had reacted, thus assuring that the molar proportions in the product were the same as in the reactor feed. Molecular weights of the products were estimated by the acetic anhydride method, based on the expected number of hydroxyl groups per molecule.

TABLE I

| Run No. | Initiator* | Catalyst | Monomers, Mole % TBGE | Other* | Molecular Weight of Product |
|---|---|---|---|---|---|
| 1 | TEG | $BF_3$ | 100 | — | 494 |
| 2 | $H_2O$ | NaOH | 50 | PO, 50 | 2000 |
| 3 | TEG | Na | 50 | PO, 50 | 500 |
| 4 | EG | $BF_3$ | 100 | — | 790 |
| 5 | TEG | Na | 75 | PO, 25 | 500 |
| 6 | EG | Na | 100 | — | 2350 |
| 7 | TEG | Na | 100 | — | 4950 |
| 8 | $H_2O$ | NaOH | 100 | — | 709 |
| 9 | $H_2O$ | NaOH | 50 | EO, 50 | 2000 |
| 10 | $H_2O$ | $BF_3$ | 100 | — | 1000 |
| 11 | $H_2O$ | KOH | 29 | PO, 71 | 1100 |
| 12 | TEG | Na | 100 | — | 17000 |
| 13 | PG | KOH | 14 | PO, 86 | 1900 |
| 14 | $H_2O$ | KOH | 50 | EO, 50 | 1200 |
| 15 | EG | KOH | 47 | EO, 53 | 1310 |
| 16 | EG | KOH | 75 | EO, 25 | 6500 |
| 17 | EG | KOH | 100 | — | 500 |
| 18 | $CH_3OH$ | Na | 100 | — | 650 |
| 19 | $CH_3OH$ | Na | 71 | PO, 29 | 700 |
| 20 | $CH_3OH$ | $BF_3$ | 100 | — | 700 |
| 21 | BPA | KOH | 50 | EO, 50 | 1200 |
| 22 | EG | KOH | 25 | EO, 75 | 1000 |
| 23 | EG | KOH | 75 | EO, 25 | 1000 |
| 24 | $H_2O$ | KOH | 50 | EO, 50 | 1370 |
| 25 | $H_2O$ | KOH | 40 | EO, 30 PO, 30 | 850 |
| 26 | $H_2O$ | KOH | 50 | EO, 50 | 1300 |
| 27 | EG | Na | 100 | — | 3000 |
| 28 | 2-Ethylhexanol | Na | 100 | — | 700 |
| 29 | Isooctanol | Na | 100 | — | 600 |
| 30 | EG | KOH | 100 | — | 970 |
| 31 | Glycerol | KOH | 25 | EO, 75 | 1100 |
| 32 | PG | KOH | 14 | PO, 86 | 1900 |
| 33 | P-400 | Na | 9 | PO, 91 | 3300 |
| 34 | $H_2O$ | $BF_3$ | 46 | THF, 54 | 1600 |
| 35 | TEG | Na | 75 | PO, 25 | 500 |
| 36 | $H_2O$ | KOH | 21 | EO, 79$^c$ | 2300 |
| 37 | $CH_3OH$ | Na | 100 | — | 500 |
| 38 | $CH_3OH$ | $BF_3$ | 100 | — | 500 |
| 39 | $CH_3OH$ | $BF_3$ | 71 | PO, 29 | 800 |
| 40 | $CH_3OH$ | $BF_3$ | 60 | PO, 40 | 600 |
| 41 | PG | $BF_3$ | 100 | — | 500 |
| 42 | $CH_3OH$ | $BF_3$ | 100 | — | 700 |

TABLE I-continued

| Run No. | Initiator[a] | Catalyst | Monomers, Mole % TBGE | Other[b] | Molecular Weight of Product |
|---|---|---|---|---|---|
| 43 | None | Al(ET)₃ | 50 | BO, 50 | >1×10⁶ |

[a]TEG is triethylene glycol, EG is ethylene glycol, PG is propylene glycol, BPA is bisphenol A and p-400 is polypropylene glycol of molecular wt. 400.
[b]PO is propylene oxide, EO is ethylene oxide, THF is tetrahydrofuran and BO is 1,2-butylene oxide.
[c]Block copolymer made by reacting one equivalent of water with first 6 eq. of EO, then 4 eq. of TBGE, then 12 eq. of EO, then 4 eq. of TBGE and, finally, 12 eq. of EO.

B. Dealkylation and Esterification of the Polymers Listed in Table I

The polymers of Table I have $n$ terminal hydroxyl groups, where $n$ is the functionality of the initiator $RH_n$. These hydroxyl groups can be esterified without disturbing the tert.-butoxy groups by reaction with an acid anhydride or, in the presence of a base, by use of an acyl halide. Attempts to esterify them with carboxylic acids in the presence of strong acid catalysts result in dealkylation (loss of isobutylene) together with esterification of the resultant primary hydroxyl groups. Thus, a particular feature of this invention is the discovery that the tert.-butyl glycidyl ether polymers and copolymers can be terminally esterified independently of the tert.-butoxy groups and that the latter groups can be simultaneously and in a single step dealkylated and, to any desired extent, esterified by reaction with a carboxylic acid. The latter reactions are catalyzed by strong acid catalysts, especially the arylsulfonic acids.

Esterification of the terminal hydroxyl groups of the tert.-butyl ether polymers and copolymers by use of acyl halides or half-esterification of acid anhydrides can be accomplished under mild conditions, such as 30°–90° C., whereas dealkylation and/or esterification of carboxylic acids requires acid catalysis and temperatures of about 90° or more for a convenient rate of reaction. When esterifying saturated acids, temperatures of about 125°–150° are preferred. When using highly polymerizable acids, such as acrylic or methacrylic acid, it is necessary to use a polymerization inhibitor, such as Cu₂O or a hydroquinone. Lower temperatures, such as about 90°–110° may be used, however, because of their higher reactivity. The progress of the reactions can be followed by measuring the amount of isobutylene and/or water produced. Removal of water can be facilitated by use of a solvent, such as toluene, that refluxes at a convenient temperature and forms an azeotrope with water. Since the desired final products have some unesterified hydroxyl content, this is usually assured by putting into the reaction mixture the amount of acid or anhydride that is needed to esterify the desired proportion, though it is also possible to use excess acid, follow the esterification by monitoring the amount of water produced, and stop the reaction at the desired point. Removal of isobutylene and/or water may be facilitated by sparging a slow stream of inert gas through the reaction mixture during the reaction.

Table II summarizes the results of a series of experiments wherein the polymers listed in Table I were dealkylated and partially esterified as described above. The starting material is identified by the Run No. as shown in Table I. The amounts of acids used in the esterification reactions are shown as moles/mole of starting material. It may be noted that in most instances excess acid was used. When the esterification was conducted stepwise with two different acids, the acid used in the first step was completely reacted, then the second acid was added and reacted either partially or entirely (e.g., Runs 59, 65, 71, 84 and 101). In Run 69 the acetate esters were made by use of acetic anhydride after the dealkylation-acrylic acid ester step was completed. In all runs in which both acrylic acid and maleic anhydride were used, the two were mixed and, hence, reacted simultaneously.

In Table II the products are characterized by the number $\alpha,\beta$-unsaturated acyl groups, the number of any other acyl groups that may be present and the number of primary hydroxyl groups (glycidol units) per molecule of the product. The ester groups were determined by NMR and the hydroxyl groups were calculated by difference, all calculations being based on the molecular weights shown in Table I.

TABLE II

| Run No. | Starting Material, Table I Run No. | Acylating Agents[a], Moles/Mole | | Products, Units/Mole | | | |
|---|---|---|---|---|---|---|---|
| | | | | Unsaturated Ester | Primary Hydroxyl | Other[b] | |
| 44 | 1 | AA, | 0.54 | | | | |
| 45 | 3 | AA, | 2.3 | | | | |
| 46 | 1 | AA, | 1.2 | | | | |
| 47 | 4 | AA, | 8.8 | | | | |
| 48 | 5 | AA, | 2.9 | | | | |
| 49 | 6 | AA, | 26 | | | | |
| 50 | 7 | AA, | 56.5 | | | | |
| 51 | 3 | AA, | 4.0 | 1.7 | .2 | | |
| 52 | 5 | AA, | 4.7 | 1.9 | .4 | | |
| 53 | 8 | AA, | 8.2 | 4.7 | .6 | | |
| 54 | 9 | AA, | 3.0 | 3.0 | 8.5 | | |
| 55 | 8 | MAA, | 7.5 | 5.3 | .2 | | |
| 56 | 11 | MAA, | 6.0 | 3.7 | .3 | | |
| 57 | 12 | MAA, | 129 | 96 | 34 | | |
| 58 | 27 | MAA, | 25 | 17 | 6 | | |
| 59 | 13 | AA, | 3.5 | 2.4 | .2 | Octanoate, | 1.5 |
| 60 | 13 | AA, | 4.0 | 3.9 | .1 | Maleate, | 2.0 |
| 61 | 14 | AA, | 8.9 | 4.7 | 2.2 | | |
| 62 | 14 | AA, | 11.5 | 5.3 | 1.6 | Maleate, | 2.0 |
| 63 | 15 | AA, | 6.7 | 4.4 | 2.9 | Maleate, | 2.0 |
| 64 | 15 | AA, | 3.7 | 4.7 | 2.6 | Maleate, | 2.0 |
| 65 | 16 | AA, | 26.4 | 20.8 | 3.8 | Phthalate, | .5 |
| 66 | 17 | AA, | 5.4 | 2.2 | 1.2 | | |
| 67 | 18 | AA, | 6.6 | 3.4 | 1.6 | | |
| 68 | 19 | AA, | 7.0 | 3.5 | .9 | | |
| 69 | 20 | AA, | 7.0 | 3.4 | .5 | Acetate, | 1.5 |
| 70 | 21 | AA, | 8.3 | 3.9 | 1.7 | | |
| 71 | 22 | AA, | 3.8 | 2.8 | 1.0 | TDI, | 0.5 |

TABLE II-continued

| Run No. | Starting Material, Table I Run No. | Acylating Agents[a], Moles/Mole | | Products, Units/Mole | | | |
|---|---|---|---|---|---|---|---|
| | | | | Unsaturated Ester | Primary Hydroxyl | Other[b] | |
| 72 | 24 | AA, | 9.9 | 4.0 | 3.9 | | |
| 73 | 25 | AA, | 4.1 | | | Maleate, | 2.0 |
| 74 | 15 | AA, | 7.6 | 3.8 | 3.7 | Maleate, | 2.0 |
| 75 | 23 | AA, | 5.8 | 2.3 | 3.4 | TBE, | 1.5 |
| 76 | 15 | AA, | 6.0 | 1.3 | 5.2 | TBE, | 1.0 |
| 77 | 15 | AA, | 5.0 | 2.0 | 5.3 | Maleate, | 2.0 |
| 78 | 26 | AA, | 8.3 | 5.4 | 2.1 | Maleate, | 2.0 |
| 79 | 27 | AA, | 10.6 | 4.6 | 8.4 | | |
| 80 | 28 | AA, | 8.4 | 2.8 | 1.8 | | |
| 81 | 29 | AA, | 8.6 | 2.6 | 2.2 | | |
| 82 | 30 | AA, | 14.7 | 5.7 | 1.6 | | |
| 83 | 31 | AA, | 7.5 | 3.0 | .9 | | |
| 84 | 23 | AA, | 7.0 | 4.8 | 2.4 | HDC, | 0.5 |
| 85 | 20 | AA, | 2.2 | 1.7 | 3.3 | TBE, | 0.4 |
| 86 | 32 | AA, | 5.0 | 2.3 | 1.7 | | |
| 87 | 33 | AA, | 4.7 | 2.1 | 1.9 | | |
| 88 | 20 | AA, | 3.4 | 1.2 | 3.2 | Itaconate, | 1.0 |
| 89 | 34 | AA, | 9.7 | 4.0 | 3.5 | | |
| 90 | 35 | AA, | 2.9 | 1.1 | 1.2 | | |
| 91 | 36 | AA, | 9.8 | 5.3 | 2.5 | | |
| 92 | 37 | AA, | 4.6 | 2.3 | 1.3 | | |
| 93 | 26 | AA, | 7.5 | 5.4 | 2.0 | | |
| 94 | 37 | AA, | 9.1 | 2.5 | 1.0 | TBE, | 0.1 |
| 95 | 37 | AA, | 5.0 | 2.9 | .6 | | |
| 96 | 38 | AA, | 5.0 | 3.3 | .2 | | |
| 97 | 39 | AA, | 6.6 | 4.0 | 1.0 | | |
| 98 | 40 | AA, | 4.8 | 2.5 | .9 | | |
| 99 | 41 | AA, | 5.3 | | | | |
| 100 | 42 | AA, | 6.7 | 4.1 | 1.0 | | |
| 101 | 10 | MA, | 4.7 | 4.7 | .3 | Stearate, | 2.5 |
| 102 | 43 | AA, | >100%[c] | 50%[c] | 50%[c] | | |
| 103[d] | 2 | AC, | 1.1 | 1.0 | 9.6 | | |
| 104[d] | 1 | AC, | 1.8 | | | | |

[a]AA is acrylic acid, MA is maleic anhydride, MAA is methacrylic acid and AC is acryloyl chloride.
[b]The maleates are maleic half-esters made by reaction of maleic anhydride. The phthalate was the diester made from the anhydride. The TDI ester (Run 71) was made by reaction with tolylenediisocyanate. TBE is tert.-butyl ether, i.e., incompletely dealkylated material. HDC ester is heptanedicarboxylate.
[c]Since the molecular weight of the starting material (Run 43) was too high to be reliably determined, results are given in terms of percentages rather than moles; i.e., the starting material was reacted with a large excess, more than 100% by weight of AA, thus esterifying 50% of the hydroxyl present.
[d]Starting material was first dealkylated, then esterified.

The esters shown in Table II were oily liquids to resinous solids, depending on molecular weight and functionality. All were readily soluble in most organic solvents but many were insoluble or only slightly soluble in water, depending on the number and size of the hydrophobic groups present.

The products shown in Table II are not pure compounds, but rather are mixtures having the average compositions shown. Where the number of primary hydroxyl groups is less than one, this signifies that some molecules contain such a group while others do not. It has been found that the advantageous properties and utilities of the products are often present in such mixtures even if on average only a small proportion, such as 10%, of the molecules contain the unsaturated ester and the primary hydroxyl groups.

To show the utility of the esters shown in Table II, they, alone or in admixture with another polymerizable monomer, were applied to Bonderite 37 treated cold-rolled 20 gauge steel plates as a film approximately 0.001 inch thick. The sheets were then exposed to 1–3 megarads of radiation in the form of a 2 million volt electron beam. The resulting films were found to be harder and more water-resistant after irradiation than before.

The above compositions were also applied as coatings on paper and on aluminum sheets and cured by 1-second exposure to U-V light from a 100 w. Hanovia mercury arc light at a distance of 5 cm.

Again, the films were harder and more water-resistant after exposure, thus evidencing polymerization and/or crosslinking by the U-V exposure.

In other experiments, the polymers of Table II were acidified with phosphoric acid and mixed with 15% by weight of a 40% by weight aqueous solution of glyoxal. The solutions were applied as films to an aluminum surface and dried at room temperatures or 60° C. In either case a tack-free water-insoluble coating was obtained which was readily soluble in aqueous alkali. If the films were irradiated with U-V or an electron beam they became insoluble in alkali.

In the above coatings tests, the compounds of Table II were used alone or with up to 98% of one or more other polymerizable vinyl monomer. Such other monomers included butyl acrylate, 2-hydroxypropyl acrylate, methyl methacrylate, acrylonitrile, methacrylonitrile and styrene. In each case, a crosslinked polymer was obtained.

We claim:
1. The process of making compounds of the formula R ((R'O)$_m$X)$_n$
wherein R is the residue left by the removal of $n$ active hydrogen atoms from an initiator compound, RH$_n$; each R' independently is an alkylene radical selected from the group consisting of ethylene, trimethylene, tetramethylene, 1,2-butylene, 2,2-bis(halomethyl)-1,3-propylene, and groups of the formula

each A independently is H, Cl, Br, or OX; each X independently is H or the acyl radical of a carboxylic acid with the proviso that at least one R' is 3-hydroxy-1,2-propylene and at least one is a group of the formula

—CH$_2$CHCH$_2$OX
      | wherein X is the acyl radical of an α,β-unsaturated carboxylic acid; and m and n are integers such that the total number of R'O groups is at least 2; said process comprising reacting by contacting an α,β-unsaturated carboxylic acid or the anhydride or acyl halide corresponding to such acid with a polymer or copolymer of tert.-butyl glycidyl ether in the presence of a strong acid catalyst.

2. The process of claim 1 wherein the catalyst is a sulfonic acid.

3. The process of claim 1 wherein the catalyst is an arylsulfonic acid and the unsaturated acid is acrylic or methacrylic acid.

4. The process of claim 1 wherein the unsaturated acid is acrylic, methacrylic, α-chloroacrylic, crotonic or cinnamic acid.

* * * * *